US009854547B2

(12) United States Patent
Chu et al.

(10) Patent No.: US 9,854,547 B2
(45) Date of Patent: Dec. 26, 2017

(54) METHOD AND APPARATUS FOR SYNCHRONIZING TIMING AMONG DEVICES IN A WIRELESS LOCAL AREA NETWORK (WLAN)

(71) Applicant: Marvell World Trade Ltd., St. Michael (BB)

(72) Inventors: Liwen Chu, San Ramon, CA (US); Hui-Ling Lou, Sunnyvale, CA (US); Hongyuan Zhang, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 248 days.

(21) Appl. No.: 14/539,130

(22) Filed: Nov. 12, 2014

(65) Prior Publication Data

US 2015/0131628 A1  May 14, 2015

Related U.S. Application Data

(60) Provisional application No. 61/902,963, filed on Nov. 12, 2013, provisional application No. 61/928,728, filed on Jan. 17, 2014, provisional application No. 61/974,940, filed on Apr. 3, 2014.

(51) Int. Cl.
*H04W 40/24* (2009.01)
*H04W 56/00* (2009.01)
(Continued)

(52) U.S. Cl.
CPC ..... *H04W 56/001* (2013.01); *H04W 56/0015* (2013.01); *H04W 72/0446* (2013.01); *H04W 40/244* (2013.01); *H04W 84/12* (2013.01)

(58) Field of Classification Search
CPC ............. H04W 40/244; H04W 56/001; H04W 56/0015; H04W 72/0446; H04W 84/12
See application file for complete search history.

(56) References Cited

U.S. PATENT DOCUMENTS

| | | | |
|---|---|---|---|
| 8,160,045 B1 * | 4/2012 | Chhabra | H04W 52/0209 370/342 |
| 8,385,319 B2 * | 2/2013 | Zuniga | H04B 1/7183 370/310.2 |

(Continued)

OTHER PUBLICATIONS

Gunnam, Kiran, Gwan Choi, Weihuang Wang, and Mark Yeary. "Multi-Rate Layered Decoder Architecture for Block LDPC Codes of the IEEE 802.11n Wireless Standard." (2007): 4 Pages.

(Continued)

*Primary Examiner* — Parth Patel
*Assistant Examiner* — Kai Chang

(57) ABSTRACT

A wireless communication device including a first media access control device and a first transceiver. The first media access control device is configured to selectively generate a first timestamp having a first length and a second timestamp having a second length. The first timestamp indicates a first synchronization time of the wireless communication device, the second timestamp indicates only a first portion of the first synchronization time, and the first synchronization time is used by a client station to synchronize timing between the wireless communication device and the client station. The first media access control device is further configured to generate a beacon including either the first timestamp or the second timestamp, and an indication of whether the beacon includes the first timestamp or the second timestamp. The first transceiver is configured to transmit the beacon from the wireless communication device to the client station.

16 Claims, 5 Drawing Sheets

(51) Int. Cl.
*H04W 72/04* (2009.01)
*H04W 84/12* (2009.01)

(56) References Cited

U.S. PATENT DOCUMENTS

| | | | | |
|---|---|---|---|---|
| 8,498,282 B2* | 7/2013 | Doi | H04W 74/04 | 370/310 |
| 8,578,493 B1* | 11/2013 | Cowan | G06F 21/554 | 709/224 |
| 9,031,053 B2* | 5/2015 | Palanki | H04B 7/15507 | 370/347 |
| 9,596,648 B2* | 3/2017 | Liu | H04W 4/08 | |
| 9,736,801 B1* | 8/2017 | Lambert | H04W 56/00 | |
| 2005/0009512 A1* | 1/2005 | Rue | H04L 12/12 | 455/420 |
| 2008/0056133 A1* | 3/2008 | Deshpande | H04W 52/0216 | 370/235 |
| 2009/0103499 A1* | 4/2009 | Hofmann | H04W 36/30 | 370/336 |
| 2009/0147768 A1* | 6/2009 | Ji | H04J 3/0664 | 370/350 |
| 2010/0014460 A1* | 1/2010 | Shin | H04J 3/0679 | 370/328 |
| 2011/0170465 A1* | 7/2011 | Tavildar | H04W 56/0015 | 370/311 |
| 2012/0057620 A1* | 3/2012 | Yamamoto | H04W 48/10 | 375/211 |
| 2012/0230322 A1* | 9/2012 | Wiatrowski | H04B 7/2643 | 370/347 |
| 2013/0142124 A1* | 6/2013 | Abraham | H04W 28/06 | 370/328 |
| 2013/0272277 A1* | 10/2013 | Suwa | H04W 56/0015 | 370/336 |
| 2013/0279381 A1* | 10/2013 | Sampath | H04W 48/08 | 370/311 |
| 2013/0279382 A1* | 10/2013 | Park | H04W 74/085 | 370/311 |
| 2013/0329719 A1* | 12/2013 | Chung | H04W 76/046 | 370/345 |
| 2014/0003315 A1* | 1/2014 | Liu | H04W 4/08 | 370/311 |
| 2014/0003343 A1* | 1/2014 | Kwon | H04W 40/02 | 370/328 |
| 2015/0109981 A1* | 4/2015 | Patil | H04L 67/1078 | 370/311 |

OTHER PUBLICATIONS

Park, Minyoung. "Proposed Specification Framework for TGah." IEEE P802.11 Wireless LANs Doc.: IEEE 802.11-yy/xxxxr06, Mar. 2012: 13 Pages.

IEEE P802.11ac™/D2.1 Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz, 802.11 Working Group of the 802 Committee, Mar. 2012, 363 pages.

IEEE P802.11ad™/D5.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE 802.11 Committee IEEE Computer Society, Sep. 2011, 601 pages.

IEEE P802.11af™/D1.05 Draft Standard for Information Technology Telecommunications and information exchange between systems—Local and metropolitan area networks—Specific requirements Part 11: Wireless LAN Medium Access Control (MAC) and Physical Layer (PHY) specifications, Amendment 4: TV White Spaces Operation, 802.11 Working Group of the 802 Committee, Nov. 2011, 123 pages.

IEEE Std 802.11b-1999/Cor Jan. 2001 (Corrigendum to IEEE Std 802.11b•1999)—IEEE Standard for Information technology Telecommunications and information exchange between systems—Local and metropolitan area networks Specific requirements, Part 11: Wireless LAN Medium Access Control (MAC) and Physical Layer (PHV) specifications, Amendment 2: Higher-speed Physical Layer (PHV) extension in the 2.4 GHz band Corrigendum 1, IEEE Computer Society, Nov. 7, 2001, 23 pages.

IEEE P802.11g/D8.2, Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band, LAN/MAN Standards Committee of the IEEE Computer Society, Apr. 2003, 69 pages.

Minyoung Park (Intel Corp): 11 Proposed TGah Draft Amendment; 11-13-0500-00-00ah-proposed-tgah-draft-amendment, IEEE SA Mentor; 11-13-0500-00-00ah-proposed-tgah-draft-amendment, IEEE-SA Mentor, Piscataway, NJ USA, vol. 802.11ah, May 19, 2013 (May 10, 2013), pp. 1-330, XP068054010, paragraph [10.1.3.2] paragraph [10.1.3.7a].

Minyoung Park (Intel): "TGah SFD D12.x ; 11-13-0130-00-00ah-tgah-sfd-d12-x", IEEE SA Mentor; 11-13-0130-00-00ah-tgah-sfd-d12-x, IEEE-SA Mentor, Piscataway, NJ USA, vol. 802.11ah, Jan. 16, 2013 (Jan. 16, 2013), pp. 1-58, XP068040532, paragraph [4.4.1.1].

International Search Report and Written Opinion corresponding to PCT/US2014/065228 dated Feb. 5, 2015, 12 pages.

* cited by examiner

METHOD AND APPARATUS FOR SYNCHRONIZING TIMING AMONG DEVICES IN A WIRELESS LOCAL AREA NETWORK (WLAN)

CROSS-REFERENCE TO RELATED APPLICATIONS

This application claims the benefit of U.S. Provisional Application No. 61/902,963, filed on Nov. 12, 2013, U.S. Provisional Application No. 61/928,728, filed on Jan. 17, 2014, and U.S. Provisional Application No. 61/974,940, filed on Apr. 3, 2014. The entire disclosures of the applications referenced above are incorporated herein by reference.

FIELD

The present disclosure relates to timing synchronization in wireless local area networks.

BACKGROUND

Wireless local area networks (WLANs) may include an access point (AP) and one or more client stations. Various operating standards for WLANs include, but are not limited to, Institute for Electrical and Electronics Engineers (IEEE) 802.11a, 802.11ac, 802.11af, 802.11ah, 802.11b, 802.11g, and 802.11n.

An access point periodically transmits a beacon frame at a target beacon transmission time (TBTT) and/or, in some 802.11 operating standards, a short beacon frame at a target short beacon transmission time (TSBTT). Each of the beacon frame and the short beacon frame may include a timestamp used for a timing synchronization function (TSF). For example, each client station in a basic service set (BSS) of the WLAN may use the timestamp in a beacon frame to synchronize timing between the AP and the client station. FIG. 1A shows an example beacon frame 100. FIG. 1B shows an example short beacon frame 104. FIG. 1C shows an example timing diagram 108 of transmission of the beacon frames 100 at TBTTs 110 and the short beacon frames 104 at TSBTTs 112.

The beacon frame 100 includes a media access control (MAC) header portion 116, which includes, for example only, a frame control field 120, a duration field 124, address fields 128 (e.g., including a source address, a destination address, etc.), a sequence control field 132, and, in some standards (e.g., 802.11n), a high throughput (HT) control field 136. The beacon frame 100 also includes a frame body field 140 and a frame check sequence (FCS) field 144. The frame body field 140 includes, for example only, an 8 byte timestamp field 148, a beacon interval field 152, a capability field 156, a service set identifier (SSID) field 160, a supported rates field 164, and a frequency hopping (FH) parameter set field 168 and other information elements associated with BSS operation.

The short beacon frame 104 includes a frame control field 172, a duration field 176, a source address field 180, a 4 byte timestamp field 184, a change sequence field 188, a next TBTT field 192, a compressed SSID field 196, an access network options field 200, optional information elements (IEs) 204, and an FCS field 208. The optional IEs 204 include a short beacon compatibility element 212, which includes, for example only, an element ID field 216, a length field 220, a capability field 224, a beacon interval field 228, and a TSF completion field 232.

SUMMARY

A wireless communication device includes a first media access control device and a first transceiver. The first media access control device is configured to selectively generate a first timestamp having a first length and a second timestamp having a second length. The first timestamp indicates a first synchronization time of the wireless communication device, the second timestamp indicates only a first portion of the first synchronization time, and the first synchronization time is used by a client station to synchronize timing between the wireless communication device and the client station. The first media access control device is further configured to generate a beacon including either the first timestamp or the second timestamp, and an indication of whether the beacon includes the first timestamp or the second timestamp. The first transceiver is configured to transmit the beacon from the wireless communication device to the client station.

A method of operating wireless communication device includes selectively generating a first timestamp having a first length and a second timestamp having a second length. The first timestamp indicates a first synchronization time of the wireless communication device, the second timestamp indicates only a first portion of the first synchronization time, and the first synchronization time is used by a client station to synchronize timing between the wireless communication device and the client station. The method further includes generating a beacon including either the first timestamp or the second timestamp and an indication of whether the beacon includes the first timestamp or the second timestamp, and transmitting the beacon from the wireless communication device to the client station.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
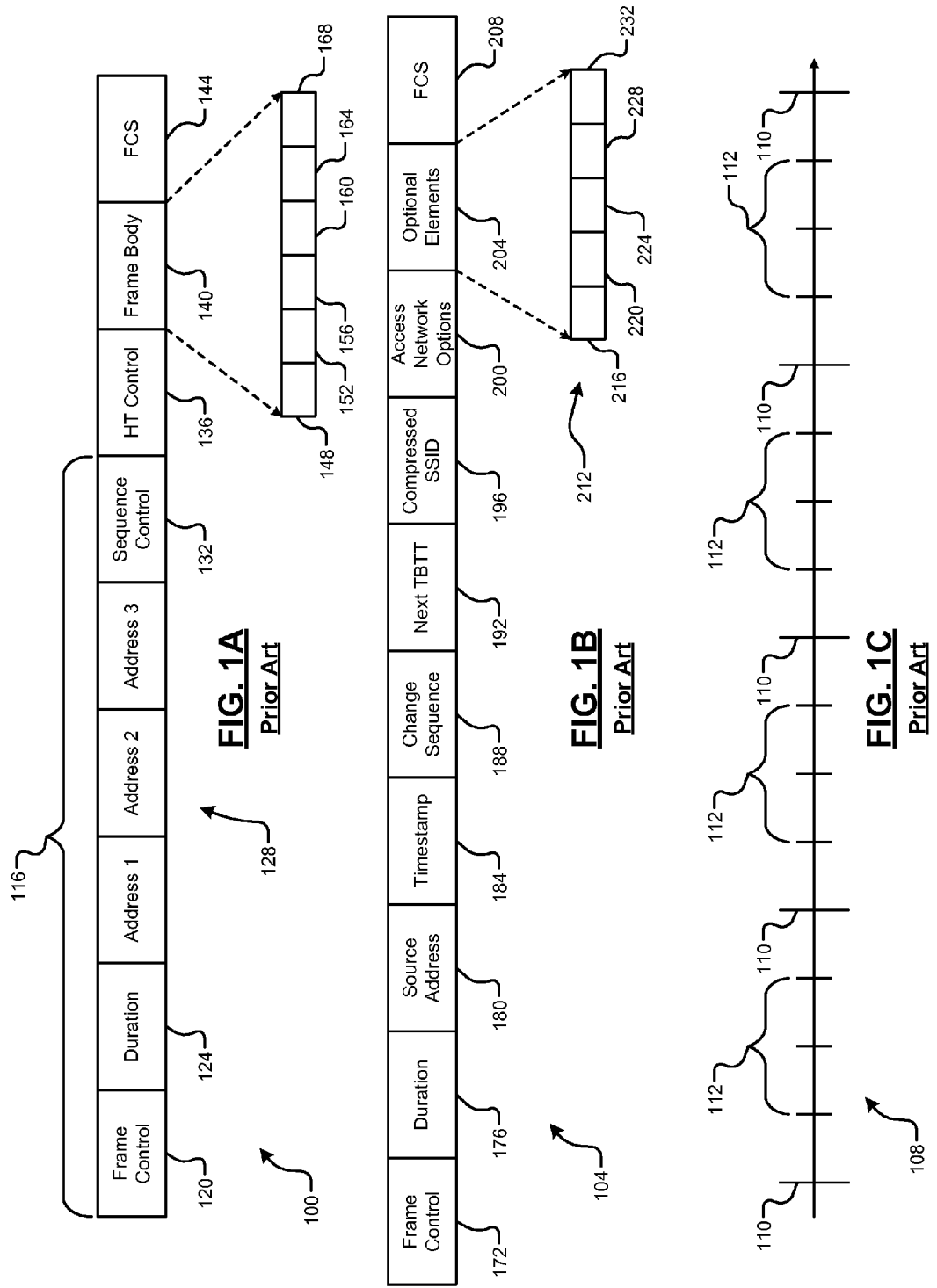
FIG. 1A is an example beacon frame.
FIG. 1B is an example short beacon frame.
FIG. 1C is an example timing diagram of transmission of beacon frames and short beacon frames.

An 8 byte timestamp field in a frame body of a beacon frame indicates a transmission time, as transmitted from an access point (AP), of a first bit of the 8 byte timestamp field. The transmission time corresponds to a timing synchronization function (TSF) time. The 8 byte timestamp field corresponds to a non-information embedding (IE) field. For example, a media access control (MAC) layer of the AP transmitting the beacon frame may set the 8-byte timestamp field. Conversely, a client station receiving the beacon frame is configured (e.g., in a MAC layer of the client station) to perform the TSF based on the 8 byte timestamp field. For example, the client station is configured to set a timer based on the 8 byte timestamp field.

In some IEEE 802.11 standards (e.g., 802.11ah), an AP may selectively transmit a beacon frame (i.e., a full beacon frame) and/or a short beacon frame. The short beacon frame may only include a 4 byte timestamp. For example only, an AP may transmit the short beacon frame only at a target short beacon transmission time (TSBTT), or at both the TSBTT and a target beacon transmission time (TBTT).

For example, when transmitted at the TBTT, the 4 byte timestamp in the short beacon frame corresponds to the least significant 4 bytes of the actual 8 byte TSF time. The 4 byte timestamp may be contained in a non-IE portion of the short beacon frame. Conversely, the most significant 4 bytes of the 8 byte TSF time are contained in a TSF completion field in a short beacon compatibility element (as set by the transmitting AP) of the short beacon frame. The short beacon compatibility element is contained in an IE portion of the short beacon frame. Accordingly, the MAC layer of the client station is not able to perform the TSF until both the 4 byte timestamp field and the TSF completion field of the short beacon frame are received. Conversely, when transmitted at the TSBTT, the short beacon frame only includes the 4 byte timestamp field corresponding to the least significant 4 bytes of the actual 8 byte TSF time in the non-IE portion of the short beacon frame.

When the least significant 4 bytes of the TSF time are initially received and processed by the MAC layer of the client station, a corresponding timer value is set with the value of the least significant 4 bytes. However, the timer value continues to increment until the most significant 4 bytes of the TSF time in the TSF completion field are received. In some circumstances, the timer value may increment from FFFFFFFF to Ser. No. 00/000,000 prior to the most significant 4 bytes being received (i.e., the timer value may roll over, or wrap). Accordingly, calculating the actual 8 byte TSF time using the separately received least significant 4 bytes and most significant 4 bytes of the 8 byte TSF time may be complicated.

Systems and methods according to the principles of the present disclosure provide a timestamp indication bit (e.g., in a frame control or other non-IE field of the short beacon frame). The timestamp indication bit identifies a format of the timestamp field. For example, the timestamp indication bit identifies whether the timestamp field includes the entire 8 byte TSF time or only the least significant 4 bytes of the TSF time. At the TBTT, the short beacon frame includes the 8 byte TSF time in the timestamp field. Conversely, at the TSBTT, the short beacon frame includes the least significant 4 bytes of the TSF time and the client station is configured to determine the actual TSF time using only the least significant 4 bytes. Accordingly, the TSF completion field can be eliminated (i.e., removed from the short beacon compatibility element).

Figure 2:
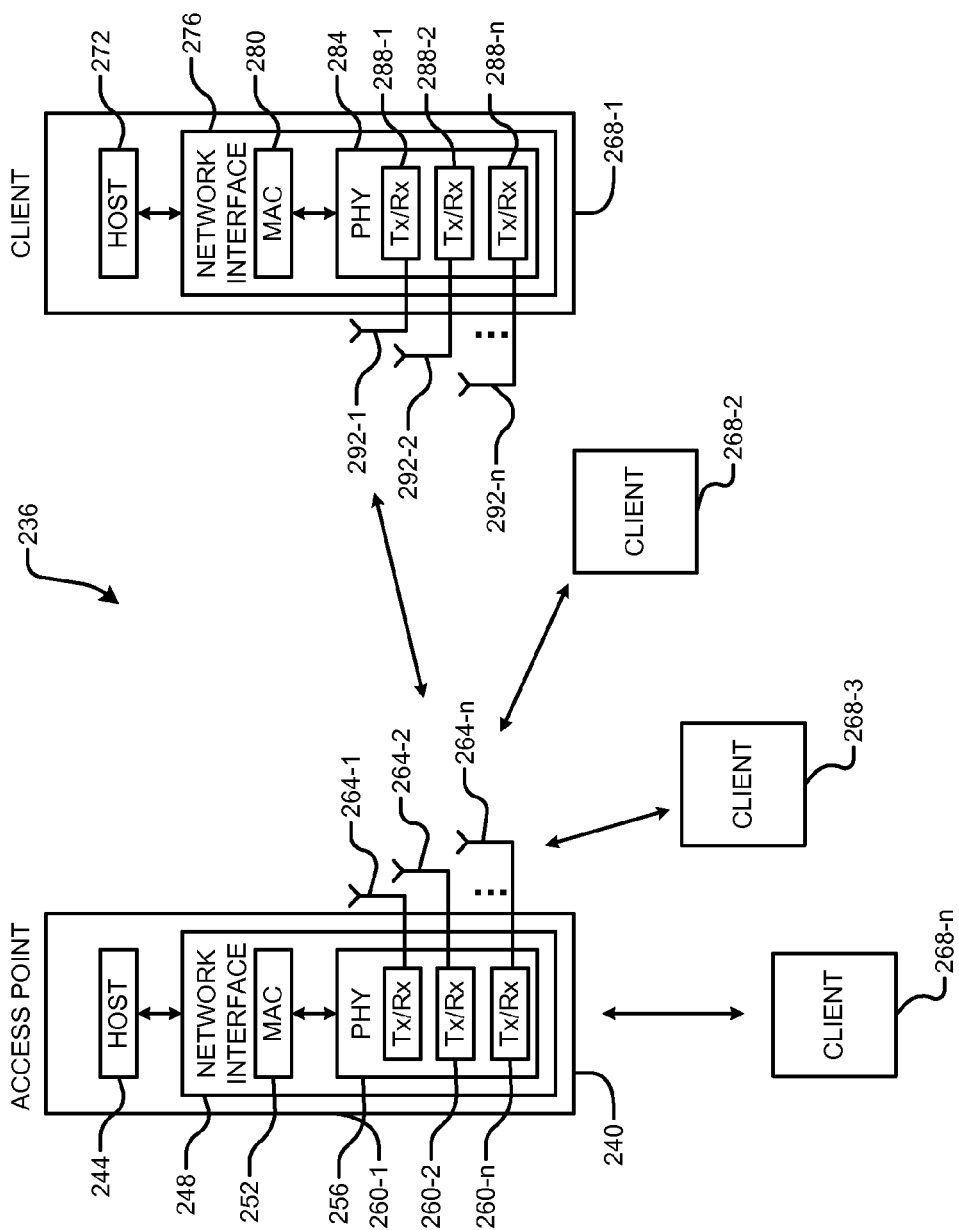
FIG. 2 is an example wireless local area network.

FIG. 2 shows an example wireless local area network (WLAN) 236 including one or more wireless communication devices configured to implement TSF time systems and methods according to an embodiment of the present disclosure. The WLAN 236 includes an access point (AP) 240 having a host processor 244 in communication with a network interface 248. The network interface 248 includes a medium access control (MAC) device 252 and a physical layer (PHY) device 256. The PHY device 256 includes one or more transceivers 260-1, 260-2, . . . , and 260-*n*, referred to collectively as transceivers 260. The transceivers 260 communicate with respective antennas 264-1, 264-2, . . . , and 264-*n*, referred to collectively as antennas 264.

The AP 240 communicates with a plurality of client stations 268-1, 268-2, 268-3, . . . , and 268-*n*, referred to collectively as client stations 268. The client station 268-1 includes a host processor 272 in communication with a network interface 276. The network interface 276 includes a MAC device 280 and a PHY device 284. The PHY device 284 includes one or more transceivers 288-1, 288-2, . . . , and 288-*n*, referred to collectively as transceivers 288. The transceivers 288 communicate with respective antennas 292-1, 292-2, . . . , and 292-*n*, referred to collectively as antennas 292. One or more of the client stations 268 may have a same or similar structure as the client station 268-1. For example only, each of the client stations 268 may have a same or different number of the transceivers 288 and the antennas 292.

The host processor 244, the MAC device 252, and/or the PHY device 256 of the AP 240 may be configured to generate beacon frames and short beacon frames for transmission to the respective client stations 268 (e.g., via the transceivers 260 and the respective antennas 264). For example, the MAC device 252 of the AP 240 generates and inserts either a 4 byte timestamp (e.g., in a short beacon frame for transmission at a TBTT) or an 8 byte timestamp (e.g., in a short beacon frame for transmission at a TSBTT) in a timestamp field of the short beacon frame and selectively sets a timestamp indication bit to indicate whether the timestamp field includes the 4 byte or the 8 byte timestamp. In an embodiment, the MAC device 252 generates and inserts the timestamp in the timestamp field using only hardware (i.e., not software) components. In embodiments, a device, controller, etc. other than the MAC device 252 may generate and insert the timestamp.

The client stations 268 each set their respective TSF times based on the 4 byte or the 8 byte timestamp field in the short beacon frame received from the AP 240. For example, the MAC device 280 sets the TSF time according to the timestamp indication bit and the timestamp field. In embodiments, a device, controller, etc. other than the MAC device 280 may set the TSF time according to the timestamp indication bit and the timestamp field.

Figure 3:
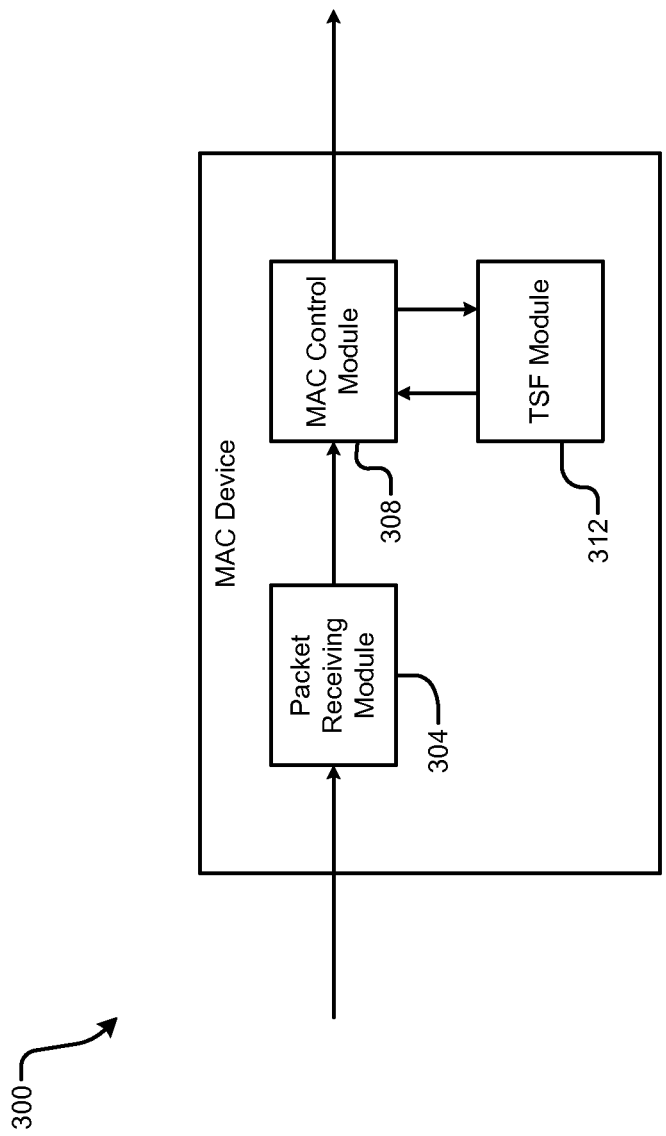
FIG. 3 is an example media access device of a client station.

FIG. 3 shows an example MAC device 300 of a client station according to an embodiment. For example, the MAC device 300 corresponds to the MAC device 280 of the client station 268-1. The MAC device 300 includes a packet receiving module 304, a MAC control module 308, and a TSF module 312. The packet receiving module 304 receives, via a PHY device (e.g., the PHY device 284), packets transmitted to the client station from an AP. For example, the packet may include a beacon, such as a short beacon frame according to embodiments of the present disclosure. The packet receiving module 304 processes the short beacon frame and provides information about and/or included in the short beacon frame to the MAC control module 308. For example, the MAC control module 308 receives, inter alia, the timestamp indication bit and the timestamp field.

The MAC control module 308 sets the TSF time of the client station according to the timestamp indication bit and the timestamp field. For example, if the timestamp indication bit indicates that the timestamp field includes an 8 byte timestamp, the MAC control module 308 may simply set the TSF time of the client station to the 8 byte timestamp. For example only, the TSF module 312 may include a timer that stores and increments an 8 byte value that corresponds to the TSF time of the client station. Accordingly, the MAC control module 308 may set the 8 byte value of the timer to the 8 byte timestamp in the timestamp field.

Conversely, if the timestamp indication bit indicates that the timestamp field includes a 4 byte timestamp, the MAC control module 308 may set only the least significant 4 bytes of the 8 byte value of the timer to the 4 byte timestamp. The MAC control module 308 also selectively increments or decrements the most significant 4 bytes of the 8 byte value based on a comparison between the 4 byte timestamp received in the short beacon frame and the least significant 4 bytes of the 8 byte value of the timer as described below in more detail.

Figure 4:
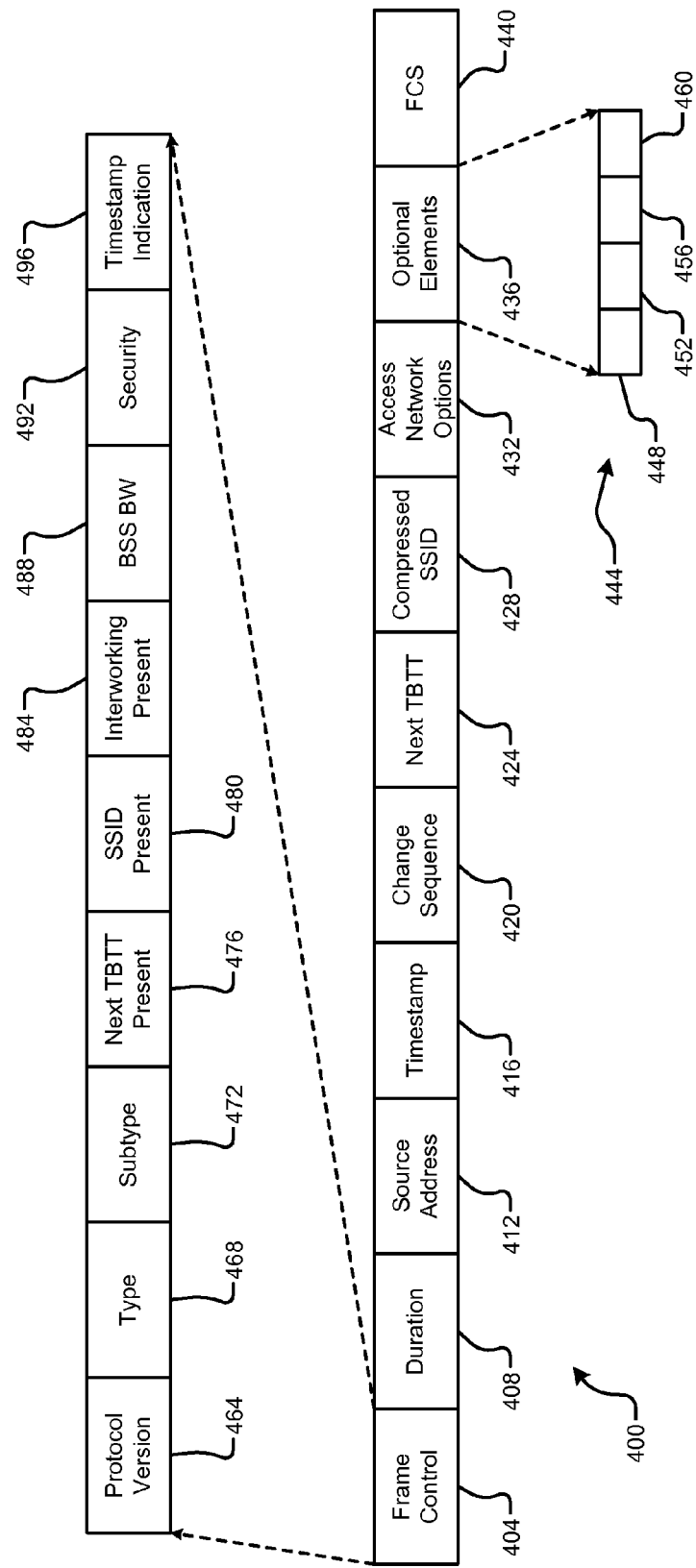
FIG. 4 is an example short beacon frame 400.

FIG. 4 shows an example short beacon frame 400 according to an embodiment. The short beacon frame 400 includes a frame control field 404, a duration field 408, a source address field 412, a 4 or 8 byte timestamp field 416, a change sequence field 420, a next TBTT field 424, a compressed SSID field 428, an access network options field 432, an optional information embedding (IE) field 436, and an FCS field 440. The optional IE field 436 includes, but is not limited to, one or more short beacon compatibility elements 444, which includes, for example only, an element ID field 448, a length field 452, a capability field 456, and a beacon interval field 460. The short beacon compatibility element does not include a TSF completion field.

The frame control field 404 includes a protocol version field 464, a type field 468, a subtype field 472, a next TBTT present field 476, an SSID present field 480, an interworking present field 484, a BSS BW (bandwidth) field 488, a security field 492, and a timestamp indication field (i.e., a timestamp indication bit) 496. In an embodiment, the timestamp indication field 496 includes a single bit that indicates whether the timestamp field 416 includes a 4 byte timestamp or an 8 byte timestamp. Accordingly, when the MAC device 280 of the receiving client station 268-1 receives the timestamp indication field 496, the MAC device 280 can determine whether the timestamp field 416 includes the 4 byte timestamp or the 8 byte timestamp. For example only, a "0" in the timestamp indication field 496 may indicate that the timestamp field 416 includes the 4 byte timestamp while a "1" in the timestamp indication field 496 may indicate that the timestamp field 416 includes the 8 byte timestamp.

For example only, the timestamp indication field 496 corresponds to bit 15 of the frame control field 404, though other bits in the short beacon frame 400 may be used. In some protocols, bit 15 of the frame control field 404 indicates a 1 MHz primary channel position. However, another field may already include an indication of the 1 MHz primary channel position, allowing bit 15 of the frame control field 404 to be used for the timestamp indication field 496.

When the short beacon frame 400 includes the 8 byte timestamp (i.e., as received at TBTT), the MAC device 280 of the receiving client station 268-1 does not need to perform any additional calculation since the 8 byte timestamp directly corresponds to the TSF time of the AP 240. Accordingly, the MAC device 280 sets a TSF time (e.g., a TSF timer that stores and increments an 8 byte timer value) of the receiving client station 268-1 to the 8 byte timestamp in the short beacon frame 400.

Conversely, if the AP 240 prepares the short beacon frame 400 including the 4 byte timestamp (i.e., as received at TSBTT), the TSF time of the AP 240 corresponds to a most significant 4 bytes and the 4 byte timestamp included in the short beacon frame 400. Accordingly, the 4 byte timestamp in the short beacon frame 400 only corresponds to the least significant 4 bytes of the entire 8 byte TSF time of the AP 240. When the MAC device 280 receives the short beacon frame 400 including the 4 byte timestamp, the MAC device 280 sets the least significant 4 bytes of the TSF time of the receiving client station 268-1 to the 4 byte timestamp. The updated TSF time of the receiving client station 268-1 corresponds to the most significant 4 bytes of the TSF time maintained by the TSF timer (e.g., according to a clock of the receiving client station 268-1) combined with the least significant 4 bytes of the TSF time received via the 4 byte timestamp.

Accordingly, if the short beacon frame 400 includes only the 4 byte timestamp, the TSF time of the receiving client station 268-1 matches (i.e., is the same as) the TSF time of the AP 240 if the most significant 4 bytes of the respective TSF times are the same. However, in some situations, the most significant 4 bytes of the TSF time of the receiving client station 268-1 may increment to a different value than the most significant 4 bytes of the TSF time of the AP 240. Systems and methods according to an embodiment of the present disclosure correct any discrepancies between the respective TSF times of the receiving client station 268-1 and the AP 240.

For example, respective clocks of the receiving client station 268-1 and the AP 240 may be slightly different. Accordingly, when the MAC device 280 sets the TSF time of the receiving client station 268-1 using the 8 byte timestamp (i.e., upon receiving the short beacon frame 400 at a TBTT), the timestamp of the receiving client station 268-1 matches the timestamp of the AP 240. However, the difference between the clocks of the receiving client station 268-1 and the AP 240 may cause the respective most significant 4 bytes of the TSF times to differ at a subsequent TSBTT (i.e., when a short beacon frame including a 4 byte timestamp is transmitted from the AP 240 to the receiving client station 268-1). However, the absolute value of a difference between the TSF times of the receiving client station 268-1 and the AP 240 may be less than FFFFFFFF/2.

Accordingly, if the 4 byte timestamp included in the short beacon frame 400 is, for example only, 000000FF (i.e., the least significant 4 bytes of the TSF time of the AP 240) and a current least significant 4 bytes of the TSF time of the receiving client station 268-1 is FFFFFF00, then the clock (and TSF time) of the AP 240 is faster than the clock (and TSF time) of the receiving client station 268-1, and therefore the most significant 4 bytes of the TSF time of the AP 240 is 1 greater than the most significant 4 bytes of the TSF time of the receiving client station 268-1.

In other words, the 4 byte timestamp of 000000FF indicates that the least significant 4 bytes of the 4 byte timestamp "rolled over" (i.e., incremented from FFFFFFFF to Ser. No. 00/000,001 . . . 000000FF, etc.), causing the most significant 4 bytes of the TSF time of the AP 240 to increment by 1. Accordingly, if the 4 byte timestamp received in the short beacon frame 400 indicates that the least significant 4 bytes of the TSF time of the AP 240 recently rolled over, then the MAC 280 sets the least significant 4 bytes of the TSF time of the receiving client station 268-1 to the 4 byte timestamp and increments the most significant 4 bytes of the TSF time of the receiving client station 268-1 by 1.

More specifically, when the 4 byte timestamp is received, the MAC 280 determines: (i) whether the most significant bit in the 4 byte timestamp is different than the most significant bit of the least significant 4 bytes of the TSF time of the receiving client station 268-1; (ii) whether the 4 byte timestamp is less than the least significant 4 bytes of the TSF time of the receiving client station 268-1; and (iii) whether a difference between the 4 byte timestamp and the least significant 4 bytes of the TSF time of the receiving client station 268-1 is greater than a predetermined threshold. For example only, the predetermined threshold corresponds to an expected maximum difference between the TSF times of the receiving client station 268-1 and the AP 240 (e.g., FFFFFFFF/2, or 2^31). If (i), (ii), and (iii) are true, then the MAC 280 increments the most significant 4 bytes of the TSF time of the receiving client station 268-1 by 1.

For example, as described above, a 4 byte timestamp of 000000FF in a short beacon and a least significant 4 bytes of the TSF time of the receiving client station 268-1 of FFFFFFF0 meets each of (i), (ii), and (iii), and therefore the MAC 280 increments the most significant 4 bytes of the TSF time of the receiving client station 268-1 by 1. Conversely, a 4 byte timestamp of FFFFFFFF in a short beacon and a least significant 4 bytes of the TSF time of the receiving client station 268-1 of FFFFFF00 does not meet each of (i), (ii), and (iii), and therefore the MAC 280 would not increment the most significant 4 bytes of the TSF time of the receiving client station 268-1 by 1. Instead, the MAC 280 would only set the least significant 4 bytes of the TSF time of the receiving client station 268-1 to FFFFFFFF.

Conversely, if the 4 byte timestamp included in the short beacon frame 400 is, for example only, FFFFFF00 (i.e., the least significant 4 bytes of the TSF time of the AP 240) and a current least significant 4 bytes of the TSF time of the receiving client station 268-1 is 0000000F, then the clock (and TSF time) of the AP 240 is slower than the clock (and TSF time) of the receiving client station 268-1, and therefore the most significant 4 bytes of the TSF time of the AP 240 is 1 less than the most significant 4 bytes of the TSF time of the receiving client station 268-1.

In other words, the least significant 4 bytes of the TSF time of the receiving client station 268-1 of 0000000F indicates that the least significant 4 bytes rolled over, causing the most significant 4 bytes of the TSF time of the receiving client station 268-1 to increment by 1. Accordingly, if the 4 byte timestamp received in the short beacon frame 400 indicates that the least significant 4 bytes of the TSF time of the AP 240 did not roll over but the least significant 4 bytes of the TSF time of the receiving client station 268-1 did roll over, then the MAC 280 sets the least significant 4 bytes of the TSF time of the receiving client station 268-1 to the 4 byte timestamp and decrements the most significant 4 bytes of the TSF time of the receiving client station 268-1 by 1.

More specifically, when the 4 byte timestamp is received, the MAC 280 determines, in addition to (i), (ii), and (iii) as described above: (iv) whether the 4 byte timestamp in a short beacon is greater than the least significant 4 bytes of the TSF time of the receiving client station 268-1; and (v) whether the difference between the 4 byte timestamp and the least significant 4 bytes of the TSF time of the receiving client station 268-1 is greater than the predetermined threshold. If (i), (iv), and (v) are true, then the MAC 280 decrements the most significant 4 bytes of the TSF time of the receiving client station 268-1 by 1.

For example, as described above, a 4 byte timestamp of FFFFFF00 and a least significant 4 bytes of the TSF time of the receiving client station 268-1 of 0000000F meets each of (i), (iv), and (v), and therefore the MAC 280 decrements the most significant 4 bytes of the TSF time of the receiving client station 268-1 by 1. Conversely, a 4 byte timestamp of FFFFFF00 and a least significant 4 bytes of the TSF time of the receiving client station 268-1 of FFFFFFFF does not meet each of (i), (iv), and (v), and therefore the MAC 280 would not decrement the most significant 4 bytes of the TSF time of the receiving client station 268-1 by 1. Instead, the MAC 280 would only set the least significant 4 bytes of the TSF time of the receiving client station 268-1 to FFFFFF00.

Figure 5:
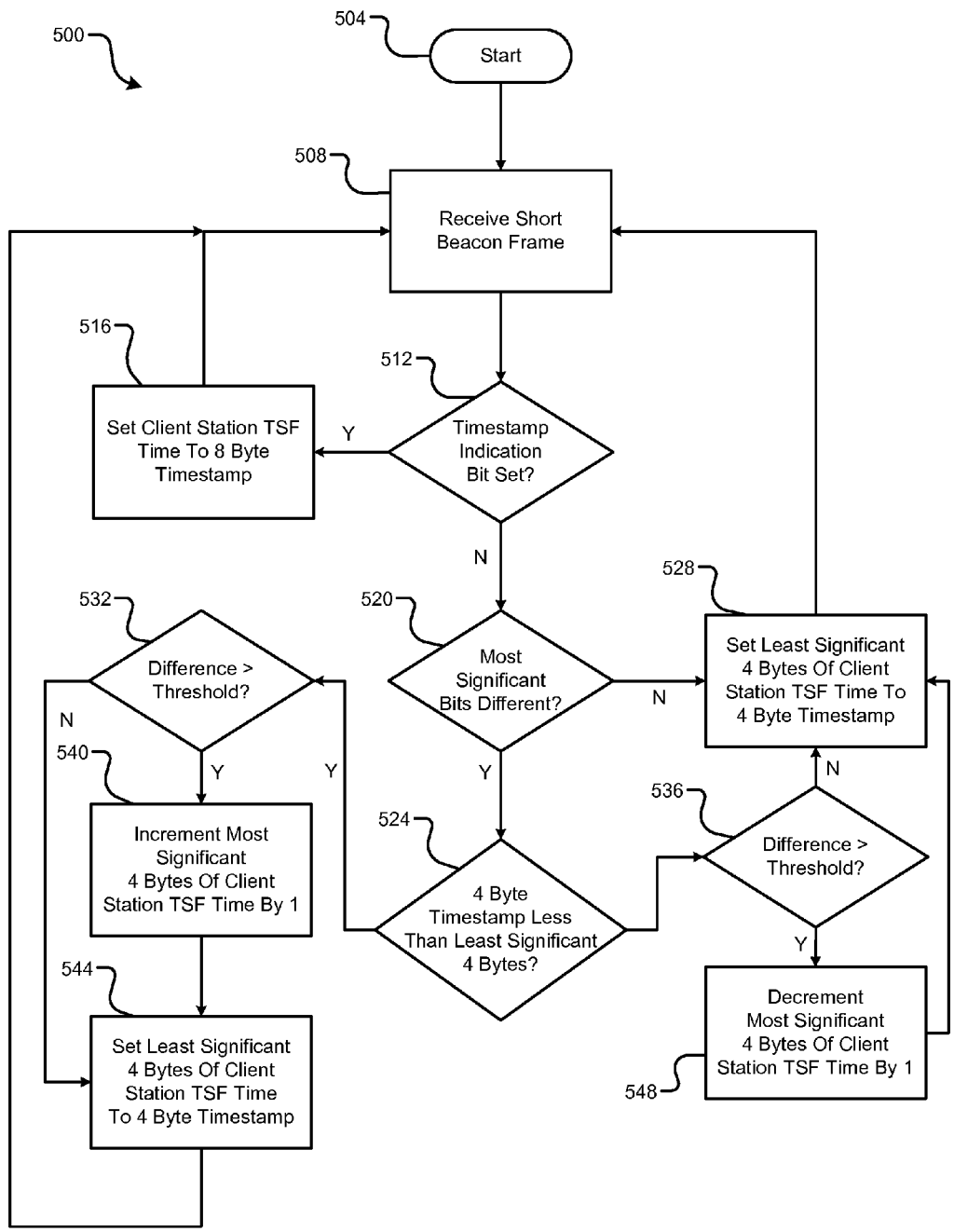
FIG. 5 is an example timing synchronization function method.

FIG. 5 shows and example TSF method 500 according to an embodiment of the present disclosure. The method 500 begins at 504. At 508, a client station receives, at a TBTT or a TSBTT, a short beacon frame including an 8 byte timestamp or a 4 byte timestamp. For example, the receiving client station 268-1 receives the short beacon frame 400 from the AP 240. At 512, the client station determines whether the short beacon frame includes an 8 byte timestamp. For example, a MAC (e.g., the MAC 280) determines whether a timestamp indication bit in the short beacon frame is set (e.g., where the bit being set indicates the 8 byte timestamp and the bit not being set indicates the 4 byte timestamp). If true, the method 500 continues to 516. If false, the method 500 continues to 520. At 516, the MAC of the client station sets its TSF time to the 8 byte timestamp and the method 500 continues to 508.

At 520, the MAC of the client station determines whether a most significant bit of the 4 byte timestamp and the most significant bit of the least significant 4 bytes of the TSF time of the client station are different. If true, the method 500 continues to 524. If false, the method 500 continues to 528. At 528, the MAC of the client station sets the least significant 4 bytes of its TSF time to the 4 byte timestamp and the method 500 continues to 508.

At 524, the MAC of the client station determines whether the 4 byte timestamp is less than the least significant 4 bytes of the TSF time of the client station. If true, the method 500 continues to 532. If false, the method 500 continues to 536. At 532, the MAC of the client station determines whether a difference between the least significant 4 bytes of the TSF time of the client station and the 4 byte timestamp is greater than a predetermined threshold (e.g., 2^31). If true, the method 500 continues to 540. If false, the method 500 continues to 544. At 540, the MAC of the client station increments the most significant 4 bytes of the TSF time of the client station by 1 and the method 500 continues to 544. At 544, the MAC of the client station sets the least significant 4 bytes of the TSF time of the client station to the 4 byte timestamp and the method 500 continues to 508.

At 536, the MAC of the client station determines whether a difference between the 4 byte timestamp and the least significant 4 bytes of the TSF time of the client station is greater than the predetermined threshold. If true, the method 500 continues to 548. If false, the method 500 continues to 528. At 548, the MAC of the client station decrements the most significant 4 bytes of the TSF time of the client station by 1 and the method 500 continues to 528. At 528, the MAC of the client station sets the least significant 4 bytes of the TSF time of the client station to the 4 byte timestamp and the method 500 continues to 508.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

The apparatuses and methods described in this application may be partially or fully implemented by a special purpose computer created by configuring a general purpose computer to execute one or more particular functions embodied in computer programs. The computer programs include processor-executable instructions that are stored on at least one non-transitory, tangible computer-readable medium. The computer programs may also include or rely on stored data. The computer programs may include a basic input/output system (BIOS) that interacts with hardware of the special purpose computer, device drivers that interact with particular devices of the special purpose computer, one or more operating systems, user applications, background services and applications, etc.

The computer programs may include: (i) assembly code; (ii) object code generated from source code by a compiler; (iii) source code for execution by an interpreter; (iv) source code for compilation and execution by a just-in-time compiler, (v) descriptive text for parsing, such as HTML (hypertext markup language) or XML (extensible markup language), etc. As examples only, source code may be written in C, C++, C#, Objective-C, Haskell, Go, SQL, Lisp, Java®, ASP, Perl, Javascript®, HTML5, Ada, ASP (active server pages), Perl, Scala, Erlang, Ruby, Flash®, Visual Basic®, Lua, or Python®.

None of the elements recited in the claims is intended to be a means-plus-function element within the meaning of 35 U.S.C. §112(f) unless an element is expressly recited using the phrase "means for", or in the case of a method claim using the phrases "operation for" or "step for".

What is claimed is:

1. A wireless communication device, comprising:
a first media access control device configured to
selectively generate (i) a first timestamp having a first length, and (ii) a second timestamp having a second length, wherein the first length and the second length are different, wherein the first timestamp indicates a first synchronization time of the wireless communication device, wherein the second timestamp indicates only a first portion of the first synchronization time, and wherein the first synchronization time is used by a client station to synchronize timing between the wireless communication device and the client station, and
selectively generate beacons having a first beacon type, a second beacon type, and a third beacon type, wherein (i) the first beacon type corresponds to a full beacon including the first timestamp having the first length, (ii) the second beacon type corresponds to a short beacon having a first configuration including, in a timestamp field, the first timestamp having the first length, and (iii) the third beacon type corresponds to a short beacon having a second configuration including, in the timestamp field, the second timestamp having the second length,
wherein, to generate the short beacon of the second beacon type and the third beacon type, the first media access control device is configured to
selectively generate the second beacon type corresponding to the short beacon having the first configuration including the first timestamp having the first length, and
selectively generate the third beacon type corresponding to the short beacon having the second configuration including the second timestamp having the second length,
wherein, in each of the second beacon type and the third beacon type, the short beacon includes a timestamp indication field including an indication of whether the timestamp field includes the first timestamp having the first length or the second timestamp having the second length; and
a first transceiver configured to transmit the short beacon from the wireless communication device to the client station.

2. The wireless communication device of claim 1, wherein the wireless communication device corresponds to an access point.

3. The wireless communication device of claim 1, wherein the first length is greater than the second length.

4. The wireless communication device of claim 1, wherein the first length is 8 bytes and the second length is 4 bytes.

5. The wireless communication device of claim 1, wherein the first media access control device is configured to generate the short beacon including the first timestamp at a target beacon transmission time.

6. The wireless communication device of claim 1, wherein the first media access control device is configured to generate the short beacon including the second timestamp at a target short beacon transmission time.

7. A system comprising (i) the wireless communication device of claim 1 and (ii) the client station, wherein the client station comprises:
a second transceiver configured to receive the short beacon transmitted from the wireless communication device to the client station; and
a second media access control device configured to
determine, based on the indication, whether the short beacon includes the first timestamp or the second timestamp,
if the short beacon includes the first timestamp, set a second synchronization time of the client station to the first timestamp, and
if the short beacon includes the second timestamp, (i) set only a first portion of the second synchronization time to the first portion of the first synchronization time corresponding to the second timestamp and (ii) selectively increment or decrement, based on a comparison between the second timestamp and the first portion of the second synchronization time, a second portion of the second synchronization time.

8. The system of claim 7, wherein (i) the first portion of the second synchronization time corresponds to a least significant 4 bytes of the second synchronization time, (ii) the second portion of the second synchronization time corresponds to a most significant 4 bytes of the second synchronization time, and (iii) the first portion of the first synchronization time corresponds to a least significant 4 bytes of the first synchronization time.

9. The system of claim 7, wherein, to determine whether to selectively increment or decrement the second portion of the second synchronization time, the second media access control device is configured to (i) determine whether a most significant bit of the first portion of the second synchronization time and a most significant bit of the second timestamp are different, (ii) determine whether the second timestamp is greater than or less than the first portion of the second synchronization time, and (iii) determine whether a difference between the second timestamp and the first portion of the second synchronization time is greater than a predetermined threshold.

10. A method of operating wireless communication device, the method comprising:

selectively generating (i) a first timestamp having a first length, and (ii) a second timestamp having a second length, wherein the first length and the second length are different, wherein the first timestamp indicates a first synchronization time of the wireless communication device, wherein the second timestamp indicates only a first portion of the first synchronization time, and wherein the first synchronization time is used by a client station to synchronize timing between the wireless communication device and the client station;

selectively generating beacons having a first beacon type, a second beacon type, and a third beacon type, wherein (i) the first beacon type corresponds to a full beacon including the first timestamp having the first length, (ii) the second beacon type corresponds to a short beacon having a first configuration including, in a timestamp field, the first timestamp having the first length, and (iii) the third beacon type corresponds to a short beacon having a second configuration including, in the timestamp field, the second timestamp having the second length, wherein generating the short beacon of the second beacon type and the third beacon type includes selectively generating the second beacon type corresponding to the short beacon having the first configuration including the first timestamp having the first length, and selectively generating the third beacon type corresponding to the short beacon having the second configuration including the second timestamp having the second length, wherein, in each of the second beacon type and the third beacon type, the short beacon includes a timestamp indication field including an indication of whether the timestamp field includes the first timestamp having the first length or the second timestamp having the second length; and transmitting the beacon from the wireless communication device to the client station.

11. The method of claim 10, wherein the wireless communication device corresponds to an access point.

12. The method of claim 10, wherein the first length is greater than the second length.

13. The method of claim 10, wherein the first length is 8 bytes and the second length is 4 bytes.

14. The method of claim 10, wherein generating the short beacon includes generating the short beacon including the first timestamp at a target beacon transmission time.

15. The method of claim 10, wherein generating the short beacon includes generating the short beacon including the second timestamp at a target short beacon transmission time.

16. The method of claim 10, further comprising, using the client station:

receiving the short beacon transmitted from the wireless communication device to the client station;

determining, based on the indication, whether the short beacon includes the first timestamp or the second timestamp;

if the short beacon includes the first timestamp, setting a second synchronization time of the client station to the first timestamp; and if the short beacon includes the second timestamp, setting only a first portion of the second synchronization time to the first portion of the first synchronization time corresponding to the second timestamp, and selectively incrementing or decrementing, based on a comparison between the second timestamp and the first portion of the second synchronization time, a second portion of the second synchronization time.

* * * * *